Sept. 2, 1924.
H. C. RICHARDSON
SANITARY PLASTIC FOOD SERVER
Filed Sept. 21, 1921    2 Sheets-Sheet 1
1,507,516
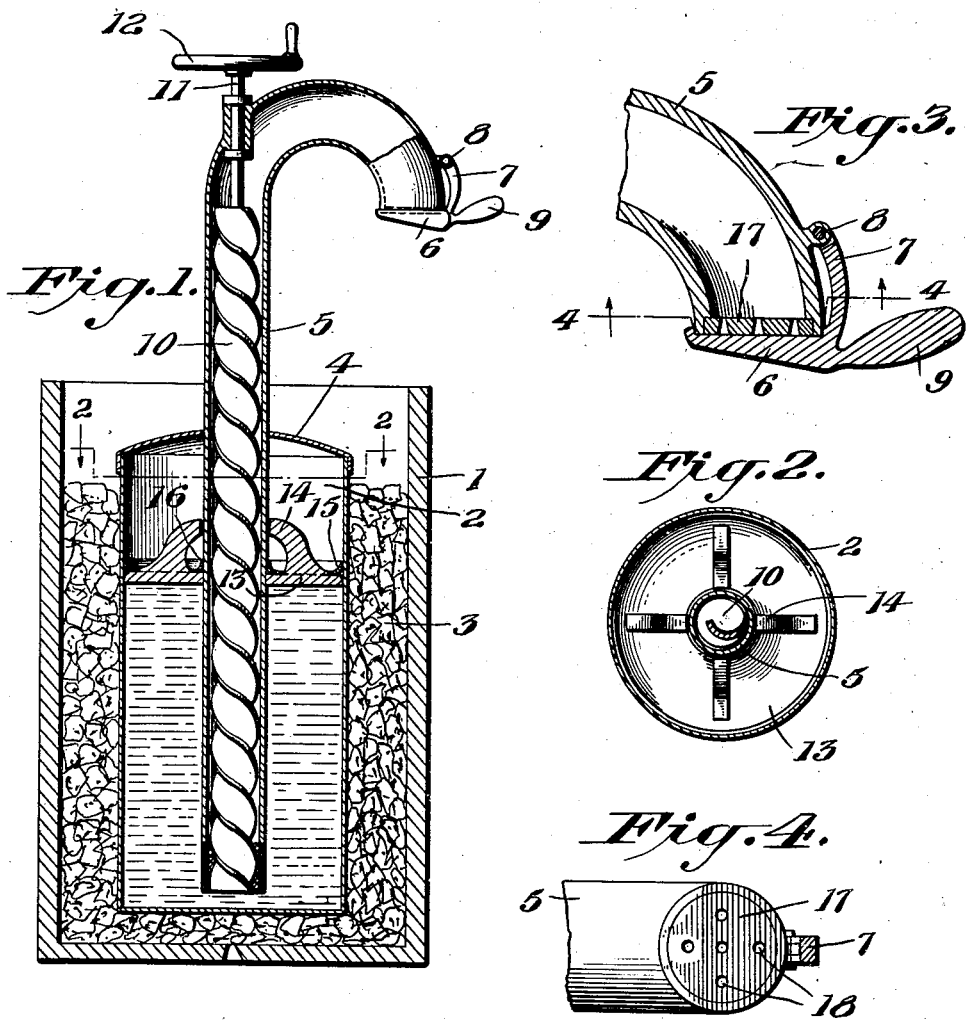
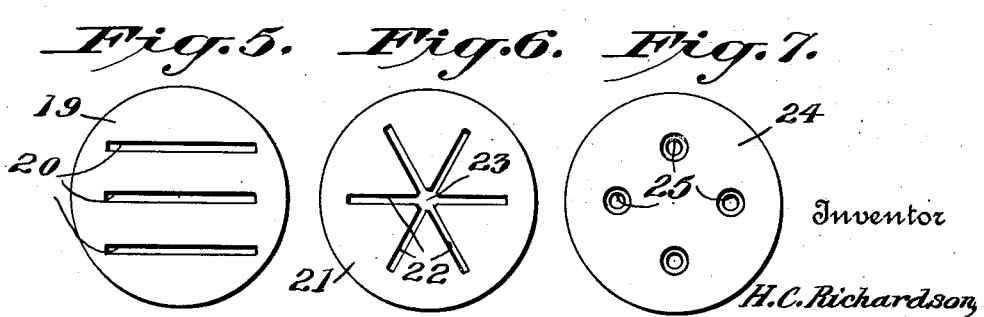
Inventor
H. C. Richardson
By Wilkinson & Giusta
Attorneys.

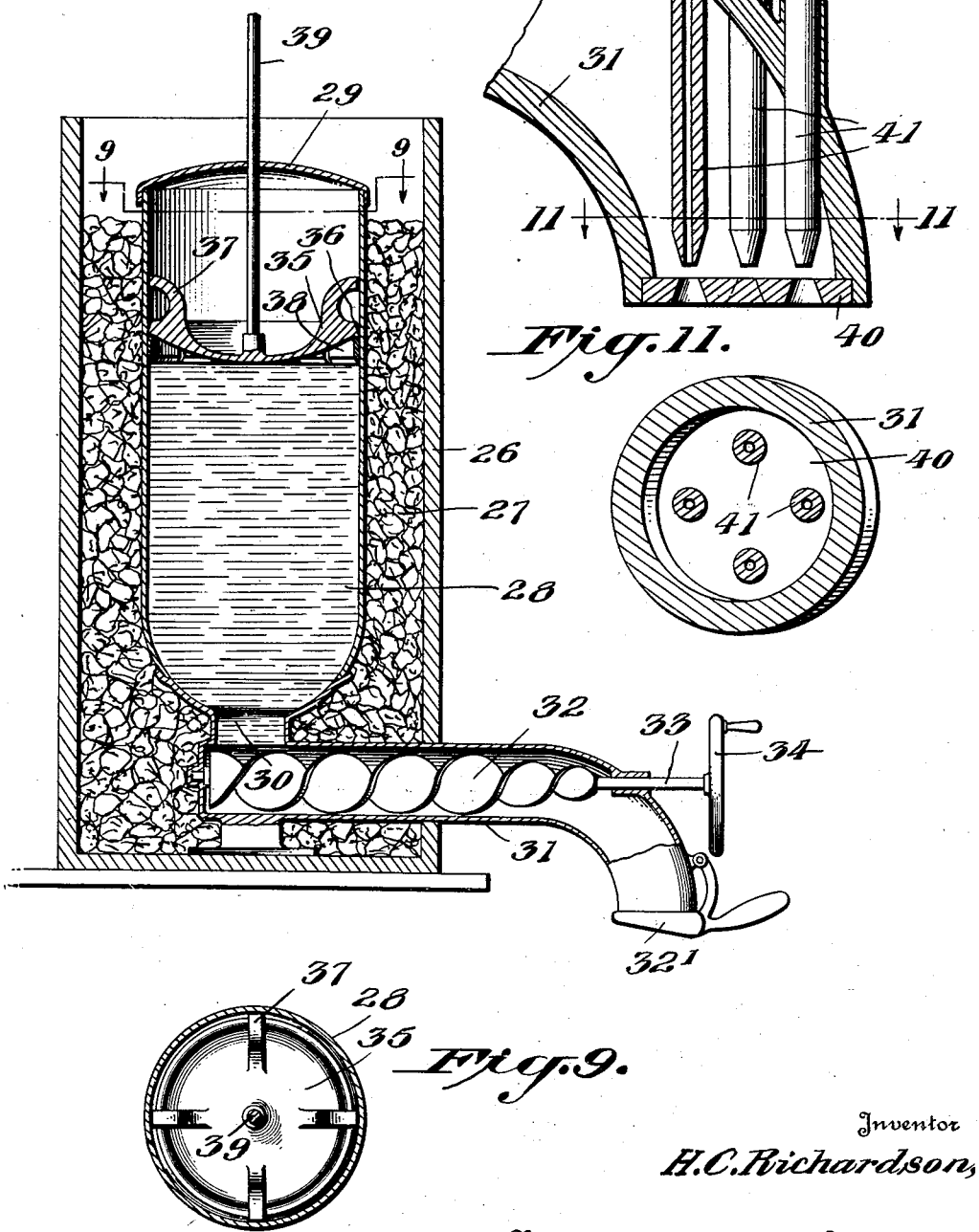

Patented Sept. 2, 1924.

1,507,516

UNITED STATES PATENT OFFICE.

HOLDEN C. RICHARDSON, OF PHILADELPHIA, PENNSYLVANIA.

SANITARY PLASTIC-FOOD SERVER.

Application filed September 21, 1921. Serial No. 502,250.

*To all whom it may concern:*

Be it known that I, HOLDEN C. RICHARDSON, a citizen of the United States, stationed at the navy yard, Philadelphia, in the county of Philadelphia and State of Pennsylvania, have invented certain new and useful Improvements in Sanitary Plastic-Food Servers; and I do hereby declare the following to be a full, clear, and exact description of the invention, such as will enable others skilled in the art to which it appertains to make and use the same.

The present invention relates to improvements in sanitary plastic food servers, and relates more particularly to an improved device for serving ice cream or other foods in a plastic condition.

It is an object of the present invention to provide improved mechanical means for serving ice cream, ices, and plastic foods of similar consistency in which the food is transferred from the initial or original container to the plates or glasses without exposure to contamination in handling, and without necessitating the opening of the original or initial container.

The invention will be found particularly useful in the sale of ice cream at soda fountains and the like places, although it is understood that it may be applied to the sale of other foods in the plastic state, such as lard, oleomargarine, butter, etc.

It is also an object of the present invention to provide improved means for giving various characters and forms to the food as it issues from the server.

A further object of the present invention lies in providing means whereby the food may be flavored or colored as it issues from the server whereby the flavor may be fresh.

In the accompanying drawings forming a part of this application, and in which similar reference symbols indicate corresponding parts in the several views:

Figure 1 is a vertical central sectional view through one form of an apparatus constructed in accordance with the present invention.

Figure 2 is a horizontal sectional view taken on the line 2—2 in Figure 1.

Figure 3 is an enlarged sectional view taken through a portion of the delivery tube or nozzle.

Figure 4 is a sectional view taken on the line 4—4 in Figure 3.

Figures 5, 6 and 7 are plan views of various die plates that may be employed, these showing mere examples.

Figure 8 is a vertical central sectional view through a modified form of apparatus.

Figure 9 is a cross sectional view on the line 9—9 in Figure 8.

Figure 10 is an enlarged sectional view of the delivery end of the tube or nozzle showing the flavoring or coloring devices applied thereto; and Figure 11 is a cross sectional view taken on the line 11—11 in Figure 10.

Referring more particularly to the drawings, and first to Figures 1 to 7 inclusive, 1 indicates the bucket in which the ice cream or other initial or original container 2 is placed within a surrounding mass of ice or other refrigerant 3. The container 2 is that in which the ice cream or other food product in a plastic or semi-plastic state is originally manufactured. A cover 4 is placed upon the initial or original container 2 in order to avoid the entrance of foreign matter, and to exclude exposure and contamination from any source.

According to the present practice of dishing ice cream or other like commodities, the cover 4 is first lifted from the container 2 and the server dips down with a scoop into the container 2, taking the requisite quantity of food from the same and thereafter depositing it upon a plate or in a sode glass. The removal of the cover 4 exposes the ice cream or other food in the container 2 to the outside atmosphere, which carries contamination thereinto and also heat which melts the upper portion of the ice cream and renders it unfit to be served. The entrance of the hand and arm of the server is also objectionable, and altogether the present method of serving food of this character is attended with the likelihood of contamination and offense to purchasers.

In accordance with the present invention the food will be transferred from the initial or original container 2 directly to the plate, soda glass, or other service utensil without any intermediate handling and without the removal of the cover 4 and consequent exposure of the contents of such can.

One manner in which this transference of food may be carried out is by employing a delivery tube or nozzle 5 which passes down centrally within the container 2 and has its lower receiving end in communication with the container at or near the base thereof. The upper delivery end of the tube or nozzle 5 is curved downwardly, and is provided with a cover plate 6 hung on arms 7 which are pivoted or hinged, as indicated at 8, to the tube or nozzle 5.

A handle 9 may be employed for swinging the cover plate 6 about the hinge or pivotal point 8, whereby the same may be removed from the delivery end of the tube or nozzle 5. The handle 9 is weighted for the purpose of automatically returning the cover plate 6 to the closed position.

Within the vertically extending portion of the tube 5 is a spiral or worm conveyer 10 adapted to lift the plastic food upwardly through the tube or nozzle 5 and force the same out through the delivery end thereof when the cover plate 6 is removed.

The shaft 11 of the conveyer 10 passes vertically upward through the curved wall of the tube or nozzle 5, and is provided on its upper outer end with some form of mechanical appliance whereby rotation may be imparted to the conveyer. A convenient means is the hand wheel 12 shown in Figure 1.

Within the container 2 is a weighted follower 13 having a number of upwardly and inwardly curved fingers 14, the free ends of which lie close to the tube 5 and guide the follower 13 in its descent in the container 2. Sealing flaps 15 and 16 are carried by the follower 13 for bearing respectively against the interior wall of the container 2 and the exterior portion of the nozzle or tube 5. Such flaps exclude air from getting beneath the follower 13, and this is important in this form of apparatus which is intended to operate substantially as follows:

When ice cream or other food in a plastic state is to be removed from the container 2, the hand wheel 12 may be turned in a proper direction to cause the lifting of the food through the nozzle or tube 5, the cover plate 6 being opened at an appropriate time to permit the food to be received in a plate, glass, or other container held beneath the delivery end of the tube or nozzle 5.

As the food is withdrawn from the base of the container 2 by the action of the conveyer 10, a partial vacuum will be created within the lower portion of the container. Through the action of suction or atmospheric pressure upon the top of the follower 13, the same will be driven downwardly with great force and will push further of the food up into the receiving end of the tube or nozzle 5.

The delivery end of the tube or nozzle 5 as shown in Figures 3 and 4, may, if desired, be provided with die plates or disks 17 having one or more openings 18 of a proper shape for imparting any desired form to the food issuing from the delivery end of said tube or nozzle. In Figure 4 these openings are shown to be five in number, while in Figure 5 the disk or die plate 19 is formed with three elongated slots 20 disposed in parallel relation. In Figure 6 a die plate or disk 21 is formed with six slots 22 radiating from a central opening 23, and in Figure 7 a disk or die plate 24 is provided with four tubular openings 25 to impart to the food the form generally given macaroni.

Of course these die plates and the slots and openings made therein are merely for the sake of illustration, and form only samples of the great numbers of arrangements of openings that may be made.

Referring more particularly to Figure 8, an apparatus similar in some particulars as herein shown but which differs in many respects from the foregoing. At 26 is shown a bucket or other receptacle for containing ice or other refrigerant 27 within which is mounted the initial or original container 28 for ice cream, butter, oleomargarine, or other food in a plastic condition. The container 28 is provided with a cover plate 29, which, in accordance with the present invention, remains in place and avoids exposure of the contents. The base of the can is provided with a neck 30 communicating with a delivery tube or nozzle 31, which passes out through the side wall of the bucket 26 near its lower end and has a downwardly turned delivery end provided with a cover plate 32 in all respects similar to the cover plate and its associated parts previously described.

Within the delivery tube or nozzle 31 is a horizontally disposed spiral conveyer 32 having a projecting shaft 33 to which is fitted a hand wheel or other mechanical appliance 34 for rotating the same.

Within the container 28 is placed a follower 35 having a beveled edge 36 adapted to form a loose fit within the container wall to allow of the free passage of air thereabout as the follower descends. Curved fingers 37 have their upper ends lying loosely against the wall of the container for guiding the follower in its descent.

A scraper ring 38 is provided beneath the follower 35 and removes the food from the side walls of the container as said follower falls. The follower is connected to a rod 39 which extends up through an opening in the cover 29 by which the follower may be caused to descend.

A die plate 40 may also be employed in conjunction with the delivery end of the tube or nozzle 31 and may have any suitable form of openings therein. Any suitable number of nozzles 41 may have their open ends arranged near the die plate 40, as shown in Figure 10, these nozzles being for the purpose of introducing coloring or flavoring matter to the food as it issues through the die plate. Of course these coloring or flavoring nozzles 41 might be mounted in a different place. They are in communication with a suitable source of flavoring or coloring material supply. They will be found particularly useful in the making of sundaes and other similar refreshments.

This form of apparatus operates in a similar way so far as the operation of the conveyer 32 is concerned and the issue of the food through the nozzle 31 is concerned; however, when the food is removed from the lower portion of the container 28 atmospheric air is allowed to compensate for the partial vacuum formed by escaping through the beveled edge 36 of the portion 35, so that the follower is not automatic in action, but must be manually pushed downwardly by pressure put upon the rod 39. This pressure will cause the food to further flow into the receiving end of the tube or delivery nozzle 31, and the scraper 38 will remove food clinging to the side walls of the container 28.

It is obvious that those skilled in the art may vary the details of construction and arrangements of parts without departing from the spirit of my invention, and therefore I do not wish to be limited to such features except as may be required by the claims.

I claim:

1. A sanitary plastic food server comprising an original container for food in a plastic condition having a permanently closed cap, a nozzle extending down through the cap with its lower end disposed near the base of the container, the upper end of said nozzle being curved or returned upon itself and having its discharge end disposed downwardly, a worm conveyor disposed within said tube and having means extending above the tube for operating said conveyor, a weighted follower guided by said nozzle and the wall of said container for pressing by its weight and atmospheric pressure upon the top of the plastic food body, a perforated die plate extending across the discharge mouth of said tube, and a cover plate for said discharge end of the nozzle having means to retain it normally closed.

2. A sanitary plastic food server comprising an original container for plastic food having a permanently closed top, a tube extending centrally down through the top and opening close to the bottom of the container, a weighted follower in the container above the food body having a central opening to receive said tube, fingers projecting upwardly from the follower and loosely extending about said tube at a distance above the follower whereby to guide the same, packing means for the edges of the follower about the tube and adjacent the container wall, means in the tube for lifting the food pushed into the tube by said follower, and means for imposing definite forms upon the food as it issues from the tube.

3. A sanitary plastic food server comprising an original container for food in a plastic condition having a closed top, a tube extending down through the top and permanently attached thereto with its lower end disposed near the base of the container, the upper end of said nozzle being curved or returned upon itself and having its discharge end disposed downwardly, conveying means disposed within said tube and having means extending through and above the tube for operating said conveying means, following means disposed about said tube within said container for pressing the plastic food toward the bottom of the container and for maintaining the said tube in substantially vertical position, and die means extending across the discharge end of said tube.

HOLDEN C. RICHARDSON.